United States Patent
Lee et al.

(10) Patent No.: US 12,210,710 B2
(45) Date of Patent: *Jan. 28, 2025

(54) TOUCH SENSOR, WINDOW LAMINATE COMPRISING SAME AND IMAGE DISPLAY DEVICE COMPRISING SAME

(71) Applicant: DONGWOO FINE-CHEM CO., LTD., Iksan-si (KR)

(72) Inventors: Cheol-Hun Lee, Iksan-si (KR); Do-Hyoung Kwon, Iksan-si (KR); Ji-Yeon Kim, Iksan-si (KR); Ki-Deok Lee, Iksan-si (KR)

(73) Assignee: DONGWOO FINE-CHEM CO., LTD, Jeollabuk-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/041,359

(22) PCT Filed: Aug. 9, 2021

(86) PCT No.: PCT/KR2021/010512
§ 371 (c)(1),
(2) Date: Feb. 10, 2023

(87) PCT Pub. No.: WO2022/035165
PCT Pub. Date: Feb. 17, 2022

(65) Prior Publication Data
US 2023/0297197 A1    Sep. 21, 2023

(30) Foreign Application Priority Data

Aug. 12, 2020  (KR) .................. 10-2020-0101295
Jul. 5, 2021  (KR) .................. 10-2021-0087561

(51) Int. Cl.
*G06F 3/041* (2006.01)
*G06F 3/044* (2006.01)

(52) U.S. Cl.
CPC .......... *G06F 3/0446* (2019.05); *G06F 3/0412* (2013.01); *G06F 3/0445* (2019.05)

(58) Field of Classification Search
None
See application file for complete search history.

(56) References Cited

U.S. PATENT DOCUMENTS 11,599,231 B2 *   3/2023   Lee .................... G06F 3/04164
2016/0048248 A1 *  2/2016   Na ......................... G06F 3/047
                                                345/174

(Continued)

FOREIGN PATENT DOCUMENTS

KR    2012-0100488 A    9/2012
KR    2014-0066441 A    6/2014

(Continued)

OTHER PUBLICATIONS

International Search Report for International Application No. PCT/KR2021/010512, mailed Nov. 5, 2021, 5 pages with English translation.

(Continued)

*Primary Examiner* — Brian M Butcher
(74) *Attorney, Agent, or Firm* — TraskBritt

(57) ABSTRACT

A touch sensor and a window laminate comprising the same, and an image display device comprising the same, the touch sensor comprising: a first electrode layer comprising a first main electrode and a first auxiliary electrode; a second electrode layer comprising a second main electrode and a second auxiliary electrode; and an insulating layer between the first electrode layer and the second electrode layer, wherein the insulating layer comprises a contact hole for electrically connecting the first electrode layer and the second electrode layer.

16 Claims, 13 Drawing Sheets

(56) References Cited

U.S. PATENT DOCUMENTS

2019/0189699 A1* 6/2019 Ye .......................... G06F 3/0446
2020/0183457 A1* 6/2020 Youn ..................... G06F 1/1641

FOREIGN PATENT DOCUMENTS

| KR | 2014-0092366 A | 7/2014 |
| KR | 2016-0001482 A | 1/2016 |
| KR | 2016-0099791 A | 8/2016 |
| KR | 2017-0089467 A | 8/2017 |

OTHER PUBLICATIONS

International Written Opinion for International Application No. PCT/KR2021/010512, mailed Nov. 5, 2021, 7 pages with English machine translation.

* cited by examiner

TOUCH SENSOR, WINDOW LAMINATE COMPRISING SAME AND IMAGE DISPLAY DEVICE COMPRISING SAME

CROSS-REFERENCE TO RELATED APPLICATIONS

This application is a national phase entry under 35 U.S.C. § 371 of International Patent Application PCT/KR2021/010512, filed Aug. 9, 2021, designating the United States of America and published as International Patent Publication WO 2022/035165 A1 on Feb. 17, 2022, which claims the benefit under Article 8 of the Patent Cooperation Treaty to Korean Patent Application Serial No. 10-2020-0101295, filed Aug. 12, 2020 and Korean Patent Application Serial No. 10-2021-0087561, filed Jul. 5, 2021.

TECHNICAL FIELD

The present disclosure relates to a touch sensor, a window laminate including the same, and an image display device including the same.

BACKGROUND

With the recent development of information technology, various input devices are also being developed, and personal computers, portable transmission devices, and other personal information processing devices perform text and graphics processing using various input devices such as keyboards and mice.

However, in accordance with the rapid development of the information society, there is a problem in that it is difficult to operate efficient products only with keyboards and mice that play the role of conventional input devices. Therefore, there is a growing need for a device that is simple and has less maloperation, and allows anyone to easily input information.

In addition, the technology of input devices is changing interest to technologies related to reliability, durability, innovation, design, and processing beyond satisfying general functions. To achieve this goal, a touch sensor has been developed as a means of an input device capable of easily inputting information such as text and graphic data.

The touch sensor is designed to be added to a display device such as a liquid crystal display (LCD), a plasma display panel (PDP), organic light emitting diode (OLED), active-matrix organic light emitting diode (AMOLED), or embedded within the display device. The touch sensor is also a device that recognizes an object, such as a finger or a touch pen, as an input signal when a finger or a touch pen is brought into contact with the screen. These touch sensors have recently been widely used in mobile devices such as mobile phones, portable multimedia players (PMPs), and smartphones, as well as in many industrial applications, such as navigation devices, netbooks, laptops, and digital information devices (DIDs), desktop computers using operating systems supporting touch input, internet protocol TV (IPTV), cutting-edge fighter jets, tanks, and armored vehicles.

For example, as in Korean Patent Publication No. 10-2014-0092366, a touch screen panel in which a touch sensor is combined with various image display devices is being developed.

Meanwhile, the touch sensor may be one in which a plurality of electrodes including a conductive material such as metal, is arranged on a substrate in order to recognize a signal caused by a user's touch. In a conventional touch sensor, a plurality of driving electrodes and sensing electrodes are formed on the same layer, and one electrode is directly connected, and the other electrode is connected using a bridge electrode. However, there is a problem in that the bridge electrode is visually recognized by the user.

In order to solve this problem, a touch sensor that does not use a bridge electrode was developed by forming the driving electrode and the sensing electrode on different layers, but due to the driving electrode and the sensing electrode being formed on different layers, there is a problem in that the electrode pattern is visible to the user due to the difference in optical refractive index, and the thickness of the insulating layer formed between the electrode layers increases to minimize parasitic capacitance noise.

Therefore, there is an increasing demand for an ultra-thin touch sensor that prevents bridge electrode visibility problems, prevents electrode patterns from being visually recognized, minimizes parasitic capacitance noise, and minimizes insulating layer thickness.

BRIEF SUMMARY

Technical Problem

An objective of the present disclosure is to provide a touch sensor with improved bridge electrode visibility.

Another objective of the present disclosure is to provide a touch sensor with improved electrode pattern visibility.

Still another objective of the present disclosure is to provide a touch sensor with improved parasitic capacitance noise characteristics.

Still another objective of the present disclosure is to provide a touch sensor with improved electrode channel resistance characteristics.

Still another objective of the present disclosure is to provide an ultra-thin-type touch sensor by minimizing the thickness of the insulating layer.

Still another objective of the present disclosure is to provide a window laminate including the touch sensor.

Still another objective of the present disclosure is to provide an image display device including the touch sensor.

Technical Solution

The present disclosure relates to a touch sensor including: a first electrode layer including a first main electrode and a first auxiliary electrode; a second electrode layer including a second main electrode and a second auxiliary electrode; an insulating layer provided between the first electrode layer and the second electrode layer, in which the insulating layer includes a contact hole for electrically connecting the first electrode layer and the second electrode layer.

In the first aspect of the present disclosure, the contact hole may be for electrically connecting the first main electrode and the second auxiliary electrode facing the first main electrode.

In the second aspect of the present disclosure, the contact hole may be formed at a point where a connection part formed in the first main electrode and a connection part formed in the second auxiliary electrode facing the first main electrode intersect in a plane direction.

In the third aspect of the present disclosure, the contact hole may be for electrically connecting the second main electrode and the first auxiliary electrode facing the second main electrode.

In the fourth aspect of the present disclosure, the contact hole may be formed at a point where a connection part formed in the second main electrode and a connection part formed in the first auxiliary electrode facing the second main electrode intersect in a plane direction.

In the fifth aspect of the present disclosure, the number of contact holes may be one or more.

In the sixth aspect of the present disclosure, the first main electrodes may include a first main electrode unit patterns that are regularly repeated and integrally connected, the first auxiliary electrodes includes a first auxiliary electrode unit patterns that are regularly repeated and integrally connected, the second main electrodes include second main electrode unit patterns that are regularly repeated and integrally connected, and the second auxiliary electrodes include second auxiliary electrode unit patterns that are regularly repeated and integrally connected.

In the seventh aspect of the present disclosure, the first main electrode includes a first hole defined by a plurality of adjacent first main electrode unit patterns. The first auxiliary electrode includes a first groove defined by a plurality of adjacent first auxiliary electrode unit patterns, in which the second main electrode unit pattern may overlap the first groove in the plane direction, and the second auxiliary electrode unit pattern may overlap the first hole in the plane direction, respectively.

In the eighth aspect of the present disclosure, the second main electrode includes a second hole defined by a plurality of adjacent second main electrode unit patterns. The second auxiliary electrode includes a second groove defined by a plurality of adjacent first auxiliary electrode unit patterns, in which the first main electrode unit pattern may overlap the second groove in the plane direction, and the first auxiliary electrode unit pattern may overlap the second hole in the plane direction, respectively.

In the ninth aspect of the present disclosure, the first main electrode further includes a first connection part connecting adjacent first main electrode unit patterns along a column direction, and the second main electrode may further include a second connection port connecting adjacent second main electrode unit patterns along the row direction.

In the tenth aspect of the present disclosure, the first connecting part may include a first hole defined by a plurality of adjacent first main electrode unit patterns, and the second connecting part may include a second hole defined by a plurality of adjacent first electrode unit patterns.

In the eleventh aspect of the present disclosure, the first main electrode unit pattern formed in the first connection part may be overlapped the second hole formed in the second connection part in a plane direction, respectively, and the second main electrode unit pattern formed in the second connection part mat be overlapped the first hole formed in the first connection part in the plane direction.

In the twelfth aspect of the present disclosure, the first electrode layer may include a first dummy electrode for distinguishing the first main electrode from the first auxiliary electrode, and the second electrode layer may include a second dummy electrode for distinguishing the main electrode from the second auxiliary electrode.

In the thirteenth aspect of the present disclosure, each of the first dummy electrodes may include a first dummy electrode unit pattern that is regularly repeated, and each of the second dummy electrodes may include a second dummy electrode unit pattern that is regularly repeated.

In the fourteenth aspect of the present disclosure, the first dummy electrode includes a first space defined by a plurality of adjacent first dummy electrode unit patterns. The second dummy electrode includes a second space defined by a plurality of adjacent first dummy electrode unit patterns, in which the first dummy electrode unit pattern may overlap the second space in the plane direction, and the second dummy electrode unit pattern may overlap the first space in the plane direction, respectively.

The present disclosure relates to a window substrate and to a window laminate, including the touch sensor laminated on one surface of the window substrate.

The fifteenth aspect of the present disclosure may include a hard coating layer laminated on the other surface facing the one surface of the window substrate.

The sixteenth aspect of the present disclosure may further include an abrasion-resistant layer laminated on the other surface of the window substrate.

In the seventeenth aspect of the present disclosure, a bottom surface of the hard coating layer may be laminated on the other surface of the window substrate, and a bottom surface of the abrasion-resistant layer may be laminated on an upper surface of the hard coating layer.

The present disclosure relates to a display panel and an image display device, including the touch sensor laminated on the display panel.

Advantageous Effects

According to the touch sensor, according to the present disclosure, by forming the driving electrode and the sensing electrode on different layers, the bridge electrode visibility may be further improved compared to the conventional touch sensor.

In addition, according to the touch sensor according to the present disclosure, the visibility of the electrode pattern is further improved compared to the conventional touch sensor by reducing the difference in optical refractive index between electrodes using a fine electrode pattern in which spatial frequency is arranged as a high-frequency component.

In addition, according to the touch sensor according to the present disclosure, the parasitic capacitance noise characteristic is further improved compared to the conventional touch sensor by minimizing the overlap between electrodes and forming a contact hole in the insulating layer.

In addition, according to the touch sensor according to the present disclosure, the electrode channel resistance characteristic may be further improved compared to the conventional touch sensor by forming a contact hole in the insulating layer.

In addition, according to the touch sensor according to the present disclosure, the thickness of the insulating layer is minimized compared to the conventional touch sensor, which may enable the implementation of an ultra-thin touch sensor.

DETAILED DESCRIPTION

The present disclosure relates to a touch sensor for improving parasitic capacitance noise and electrode channel resistance characteristics by forming a contact hole in an insulating layer, in which by forming the first electrode layer and the second electrode layer on different layers with an insulating layer interposed therebetween, the visibility problem caused by the bridge electrode is solved, and relates to a window laminate including the same, and an image display device including the same.

More specifically, the present disclosure relates to a touch sensor including: a first electrode layer including a first main electrode and a first auxiliary electrode; a second electrode layer including a second main electrode and a second auxiliary electrode; an insulating layer provided between the first electrode layer and the second electrode layer, in which the insulating layer includes a contact hole for electrically connecting the first electrode layer and the second electrode layer, a window laminate including the same, and an image display device including the same.

Hereinafter, with reference to the drawings, preferred embodiments of the present disclosure will be described in more detail. However, since the following drawings attached to this specification illustrate the preferred embodiments of this disclosure and serve to more clearly understand the technical idea of this disclosure together with the aforementioned contents, this disclosure should not be limited to the matters described in such drawings.

As used in this application, terms such as "x-axis," "y-axis," "row," "column," "top," and "bottom" are used relatively to distinguish different configurations or directions and does not indicate an absolute order or direction.

Touch Sensor

Figure 1A:
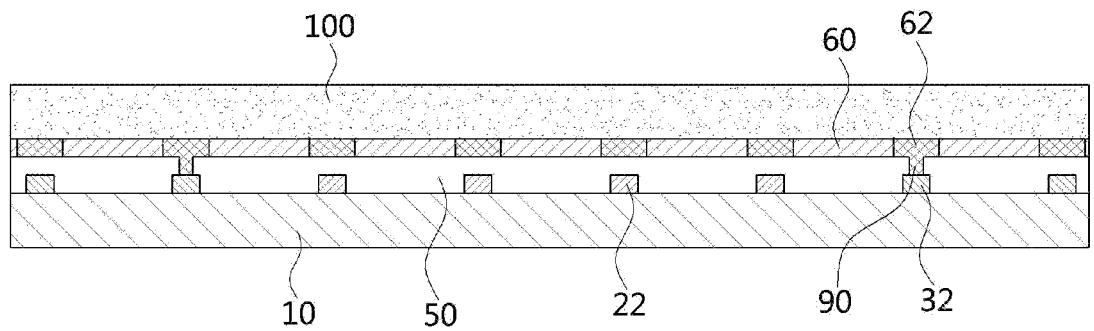
FIG. 1A is a schematic cross-sectional view of a cut taken along the A-A' line in FIG. 11.
Figure 1B:
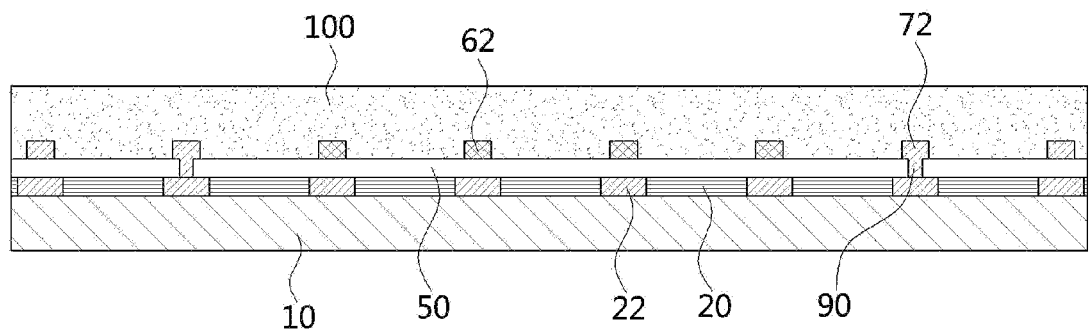
FIG. 1B is a schematic cross-sectional view of a cut taken along the B-B' line in FIG. 11.
Figure 11:
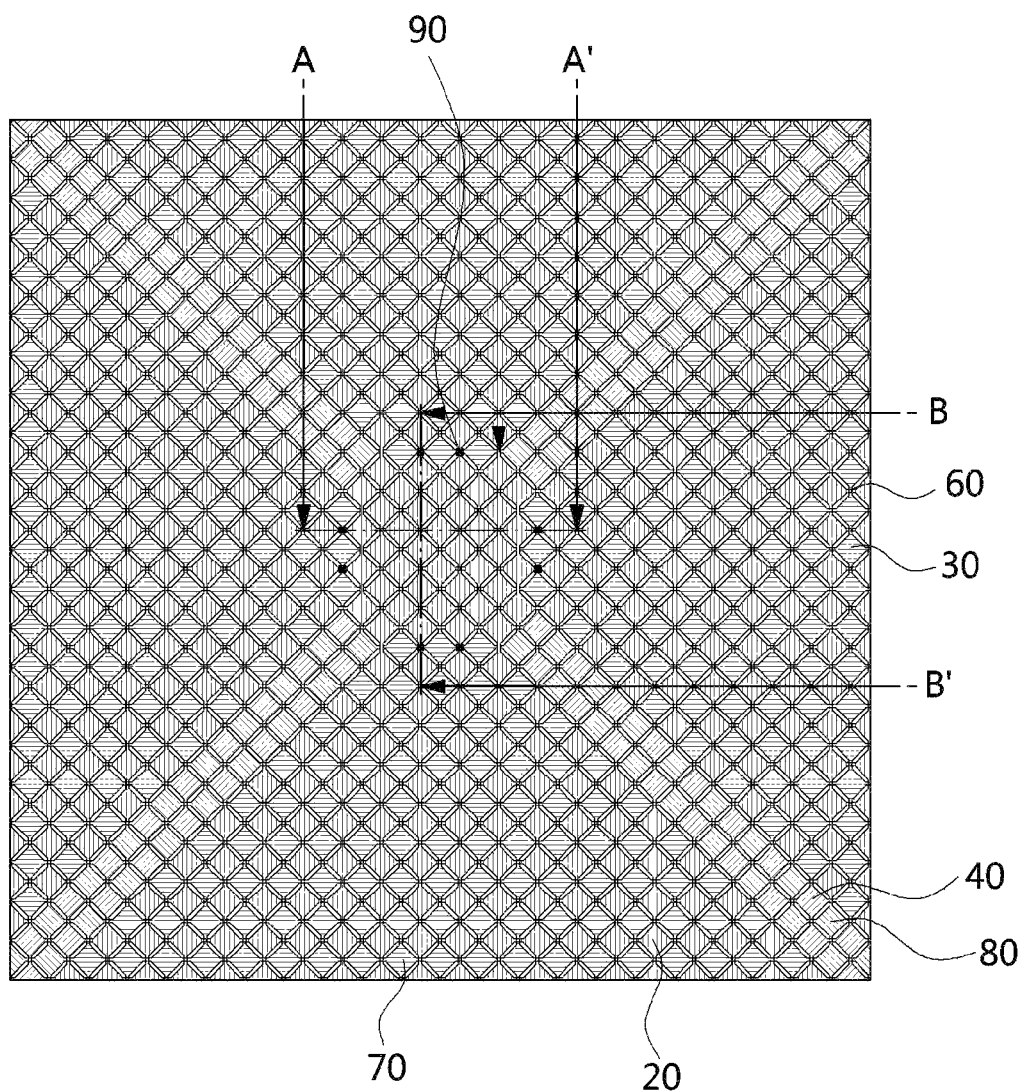
FIG. 11 is a schematic top plan view showing an electrode layer of a touch sensor according to example embodiments.

FIG. 1A is a schematic cross-sectional view of a cut taken along the A-A' line in FIG. 11, and FIG. 1B is a schematic cross-sectional view of a cut taken along the B-B' line in FIG. 11.

Referring to FIGS. 1A and 1B, the touch sensor of the present disclosure may include a first electrode layer and a second electrode layer provided on a base layer 10. The first electrode layer and the second electrode layer may be spaced apart from each other in a thickness direction with an interlayer insulating layer 50 interposed therebetween. The first electrode layer and the second electrode layer may be electrically connected by a contact hole 90 formed in a part of the insulating layer 50.

The base layer 10 is not particularly limited as long as the base layer serves as a base capable of structurally supporting the electrode layer or the insulating layer 50, etc., and may include a film-type base substrate. In one or more embodiments, the base layer 10 may include: glass; polymer materials such as cyclic olefin polymer (COP), polyethylene terephthalate (PET), polyacrylate (PAR), polyetherimide (PEI), polyethylene naphthalate (PEN), polyphenylene sulfide (PPS), polyallylate, Polyimide (PI), cellulose acetate propionate (CAP), polyethersulfone (PES), cellulose triacetate (TAC), polycarbonate (PC), cyclic olefin copolymer (COC), polymethyl methacrylate (PMMA); and/or an inorganic insulating material such as silicon oxide, silicon nitride, silicon oxynitride, or metal oxide.

A layer or film member of an image display device may be provided as the base layer 10 of the touch sensor. In one or more embodiments, an encapsulation layer or a passivation layer included in the display panel may be provided as the base layer 10.

The first electrode layer includes a first main electrode and a first auxiliary electrode and may be formed by including a connection part 22 for connecting the first main electrode unit pattern 20 constituting the first main electrode and a connection part 32 for connecting the first auxiliary electrode unit pattern constituting the first auxiliary electrode. The first electrode layer may be formed on an upper surface of the base layer 10. The configuration and structure of the first electrode layer will be described later in more detail with reference to FIGS. 2 to 5.

The insulating layer 50 may be formed on the base layer 10 to cover the first electrode layer. The insulating layer 50 is not particularly limited as long as the insulating layer serves to electrically insulate the first electrode layer and the second electrode layer, and in one or more embodiments, the insulating layer may include an organic insulating material such as an epoxy-based resin, an acrylic-based resin, a siloxane-based resin, and polyimide-based resin, and/or an inorganic insulating material such as silicon oxide, silicon nitride, and the like.

The second electrode layer includes a second main electrode and a second auxiliary electrode, and a connection part 62 for connecting the second main electrode unit pattern 60, constituting the second main electrode, and a connection part 72 for connecting the second auxiliary electrode unit pattern constituting the second auxiliary electrode. The second electrode layer may be formed on an upper surface of the insulating layer 50. The configuration and structure of the second electrode layer will be described later in more detail with reference to FIGS. 6 to 9.

The contact hole 90 may be formed in a part of the insulating layer 50 to electrically connect the first electrode layer and the second electrode layer. In one embodiment, the contact hole 90 may be formed to electrically connect each of a connection part 62 for connecting the second main electrode unit pattern 60 and a connection part 32 for connecting the first auxiliary electrode unit pattern; and a connection part 22 for connecting the first main electrode unit pattern 20 and the connection part 72 for connecting the second auxiliary electrode unit pattern. The configuration and structure of the contact hole will be described later in detail with reference to FIGS. 10A-10C and 11.

In an embodiment, the first electrode layer and the second electrode layer may be formed by including a transparent conductive oxide. Examples of transparent conductive oxide may include at least one selected from the group consisting of indium tin oxide (ITO), indium zinc oxide (IZO), zinc oxide (ZnO), indium zinc tin oxide (IZTO), and cadmium tin oxide (CTO).

In another embodiment, the first electrode layer and the second electrode layer may be formed of metal. Examples of the metal may include at least one selected from the group consisting of silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca), and an alloy thereof (e.g., silver-palladium-copper (APC)), and the like.

In some embodiments, the first electrode layer and the second electrode layer may include a laminated structure of a transparent conductive oxide layer and a metal layer. For example, each of the first electrode layer and the second electrode layer may have a three-layer structure of a transparent conductive oxide layer, a metal layer, and a transparent conductive oxide layer. In this case, while flexible characteristics are improved by the metal layer, signal transmission speed may be improved by lowering resistance, and corrosion resistance and transparency may be improved by the transparent conductive oxide layer.

In some embodiments, each of the first electrode layer and the second electrode layer may include a mesh-shaped metal electrode pattern. When the first electrode layer and the second electrode layer are formed by including the mesh-shaped metal electrode pattern, the conductivity and detection strength of the touch sensor can be improved by reducing the resistance between the electrodes or between the electrodes and the wiring, and there is an advantage in that the flexible characteristic can be further improved.

A passivation layer 100 may be formed on the insulating layer 50 to cover the second electrode layer. The passivation layer 100 is not particularly limited as long as the passivation layer can protect the electrode layer and the insulating film from the outside, and in one or more embodiments, the passivation layer may include an inorganic insulating material such as an epoxy-based resin, an acrylic-based resin, a siloxane-based resin, a polyimide-based resin, and the like.

FIGS. 2 to 5 are schematic top plan views showing a first electrode layer of a touch sensor according to exemplary embodiments of the present disclosure.

Figure 2:
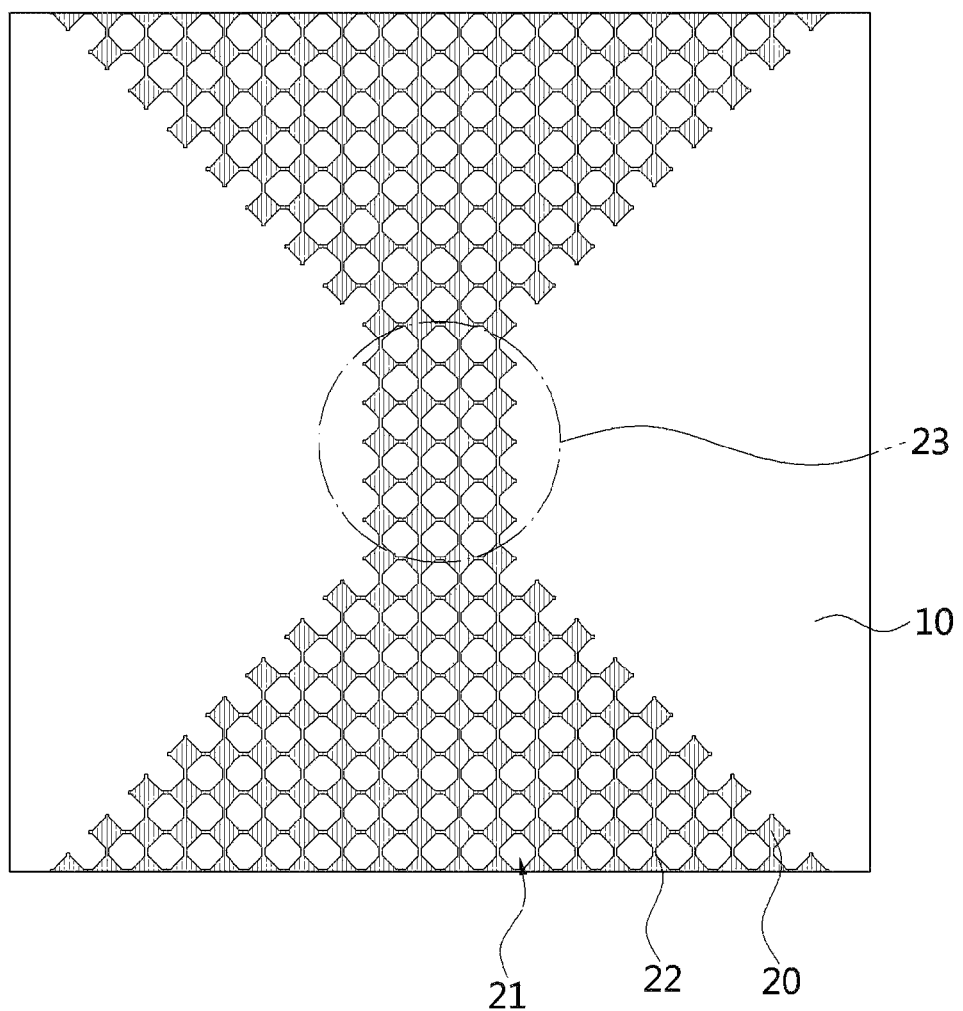
FIGS. 2 to 5 are schematic top plan views showing a first electrode layer of a touch sensor according to exemplary embodiments of the present disclosure.
Figure 3:
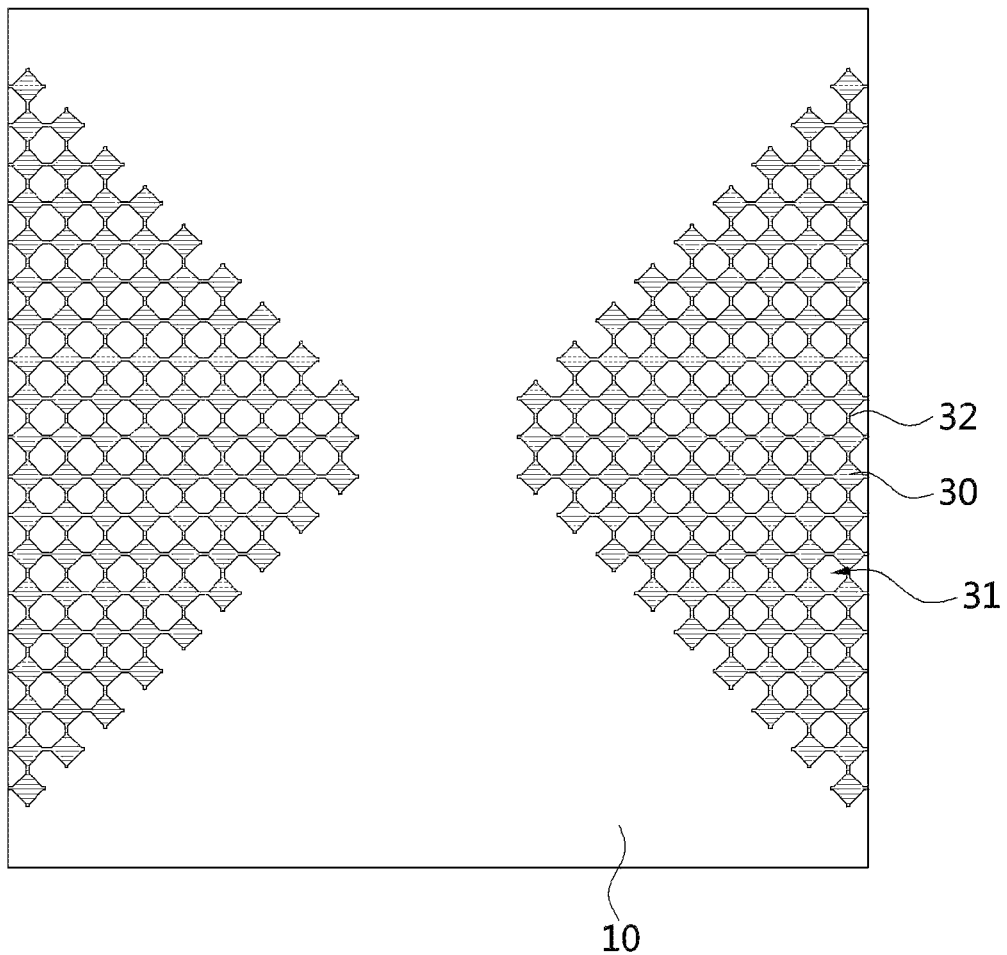
Figure 4:
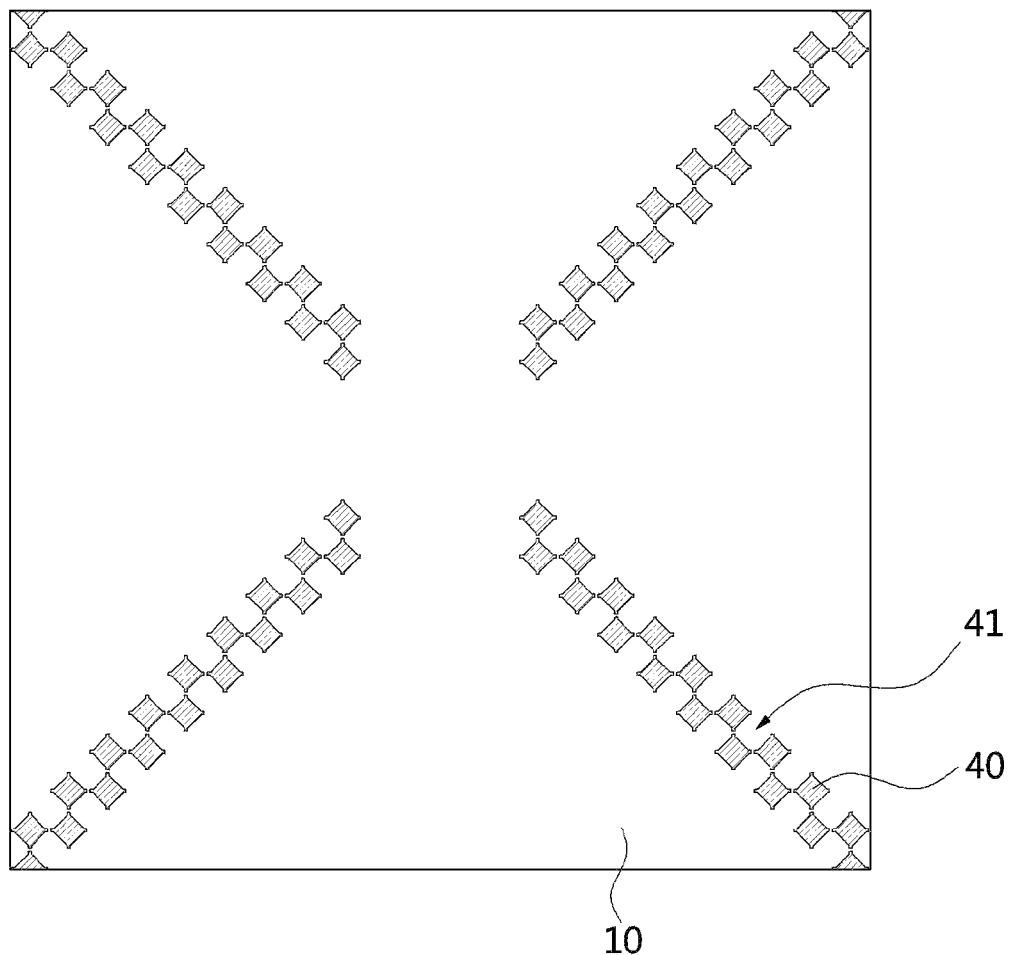
Figure 5:
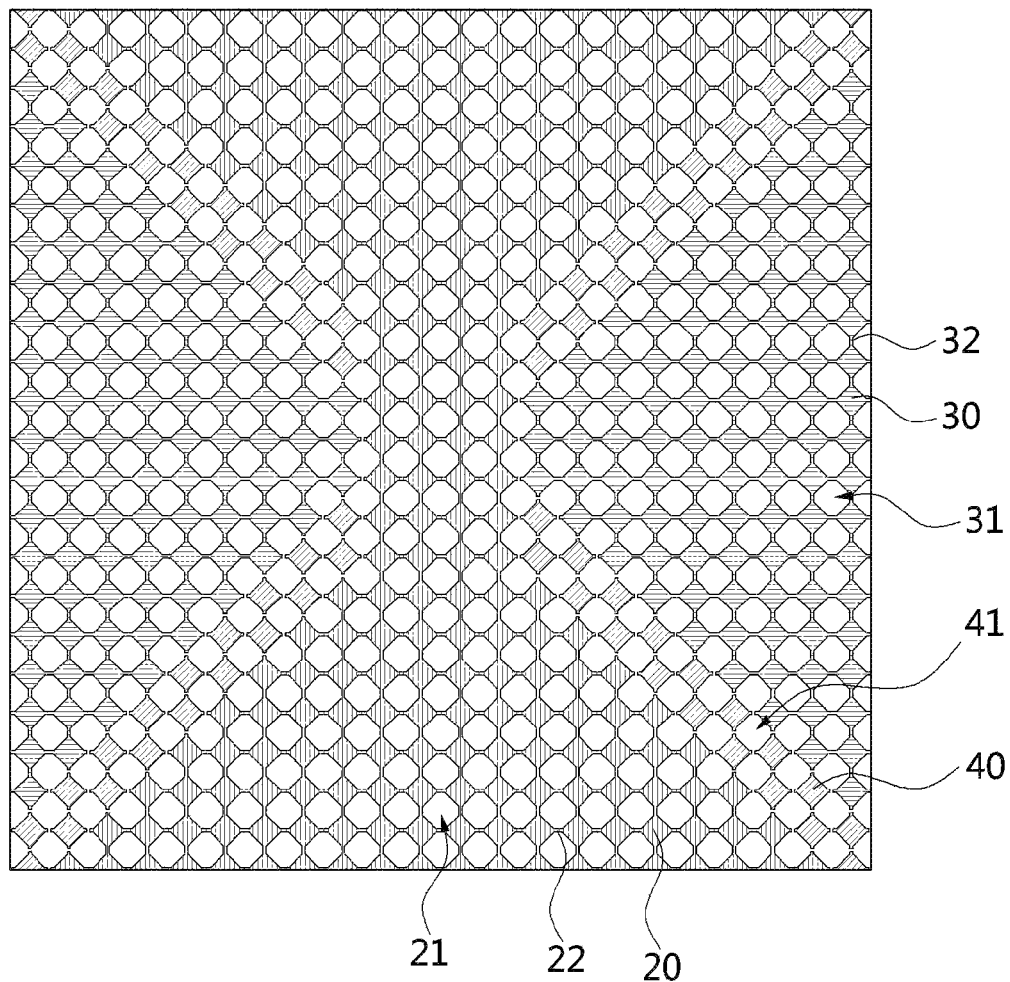

Specifically, FIG. 2 is a top plan view showing the first main electrode in isolation. FIG. 3 is a top plan view showing the first auxiliary electrode in isolation. FIG. 4 is a top plan view showing the first dummy electrode in isolation. FIG. 5 is a top plan view showing the first main electrode, the first auxiliary electrode, and a first dummy electrode together.

Referring to FIG. 2, the first main electrode may be formed on the base layer 10.

In one embodiment, the first main electrode may include a plurality of first main electrode unit patterns 20 that have a polygonal pattern shape, such as a rhombus shape, and are regularly repeated. In some embodiments, the first main electrode unit pattern 20 may have a shape substantially the same as or similar to that of the second groove 71 (see FIG. 7).

In an embodiment, the plurality of the first main electrode unit patterns 20 may be arranged along a column direction, and the first main electrode unit patterns 20 adjacent to each other in the column direction may be physically and electrically connected to the first main electrode unit pattern 20 provided in the first connection part 23.

In one embodiment, the plurality of the first main electrode unit patterns 20 are integrally connected by the first connection part 23 to form the first main electrode unit pattern columns extending in the column direction. The plurality of the first main electrode unit pattern columns may be arranged along a row direction.

The first main electrode unit pattern 20 may be physically and electrically connected by the adjacent first main electrode unit pattern 20 and a connection part 22, and the connection part 22 may be integrally formed with the first main electrode unit pattern 20.

The first main electrode may be formed by including a first hole 21. The first hole 21 is defined as a through-hole formed by the arrangement of a plurality of adjacent first main electrode unit patterns 20, and the upper surface of the base layer 10 is exposed through the first hole 21.

In one embodiment, the first hole 21 may have a polygonal shape, such as a substantially rhombic shape, and may be regularly repeated. The first hole 21 may also be formed in the first connection part 23.

Referring to FIG. 3, the first auxiliary electrode may be formed on the base layer 10.

According to an embodiment, when observed in a plane direction, the first auxiliary electrode may be formed on a portion of the upper surface of the base layer 10 where the first main electrode is not formed. The first auxiliary electrode may be formed around the first main electrode and spaced apart from the first main electrode.

In one embodiment, the first auxiliary electrode may include a plurality of first auxiliary electrode unit patterns 30 that have a polygonal pattern shape, such as a rhombus shape, and are regularly repeated. In one embodiment, the first auxiliary electrode unit pattern 30 may have a shape substantially the same as or similar to that of the second hole 61 (see FIG. 6).

The first auxiliary electrode unit pattern 30 may be physically and electrically connected by the adjacent first auxiliary electrode unit pattern 30 and a connection part 32, and the connection part 32 may be integrally formed with the first auxiliary electrode unit pattern 30.

The first auxiliary electrode may be formed to include the first groove 31. The first groove 31 is defined as a through-hole formed by the arrangement of a plurality of adjacent first auxiliary electrode unit patterns 30, and the upper surface of the base layer 10 is exposed through the first groove 31.

In one embodiment, the first groove 31 may have a polygonal shape, such as a substantially rhombic shape, and may be regularly repeated.

Referring to FIG. 4, a first dummy electrode may be formed on the base layer 10.

According to an embodiment, the first dummy electrode may be formed on a portion of the upper surface of the base layer 10 where the first main electrode and the first auxiliary electrode are not formed when viewed in a plane direction. The first dummy electrode may be formed around the first main electrode and the first auxiliary electrode and formed adjacent to the first main electrode and the first auxiliary electrode.

In one embodiment, the first dummy electrode may include a plurality of first dummy electrode unit patterns 40 that have a polygonal pattern shape, such as a rhombus shape, and are regularly repeated. In one embodiment, the first dummy electrode unit pattern 40 may have a shape substantially the same as or similar to that of the second space 81 (see FIG. 8).

The first dummy electrode unit patterns 40 may have separate floating patterns or island patterns but are not limited thereto and may be integrally formed by connecting the respective patterns.

The first dummy electrode may be formed to include the first space 41. The first space 41 is defined as a through-hole formed by the arrangement of a plurality of adjacent first dummy electrode unit patterns 40, and the upper surface of the base layer 10 is exposed through the first space 41. In one embodiment, the first space 41 may be a through-groove formed by a first main electrode unit pattern 20 or a first auxiliary electrode unit pattern 30 adjacent to three adjacent first dummy electrode unit patterns 40.

In one embodiment, the first space 41 may have a substantially rhombic shape in which one or more vertices are opened and may be repeated regularly but is not limited thereto, and the first space 41 may have a polygonal shape substantially like a rhombus shape by the integrally formed first dummy electrode unit pattern and may be regularly repeated.

Referring to FIG. 5, as described above, the first electrode layer may be formed by including a first main electrode, a first auxiliary electrode, and a first dummy electrode arranged on the upper surface of the base layer 10.

As shown in FIG. 5, the first auxiliary electrode may be disposed at a predetermined distance from the first main electrode, and the first dummy electrode may be disposed of adjacent to the first main electrode and the first auxiliary electrode.

Therefore, the electrode pattern, the hole, the groove, and the space as a whole may be regularly repeated on the upper surface of the base layer 10, and the upper surface of the base layer 10 may be uniformized into an arrangement structure in the form of a spatial frequency including high-frequency components as a whole due to the repeating structure described above.

FIGS. 6 to 9 are schematic top plan views showing a second electrode layer of a touch sensor according to exemplary embodiments of the present disclosure.

Figure 6:
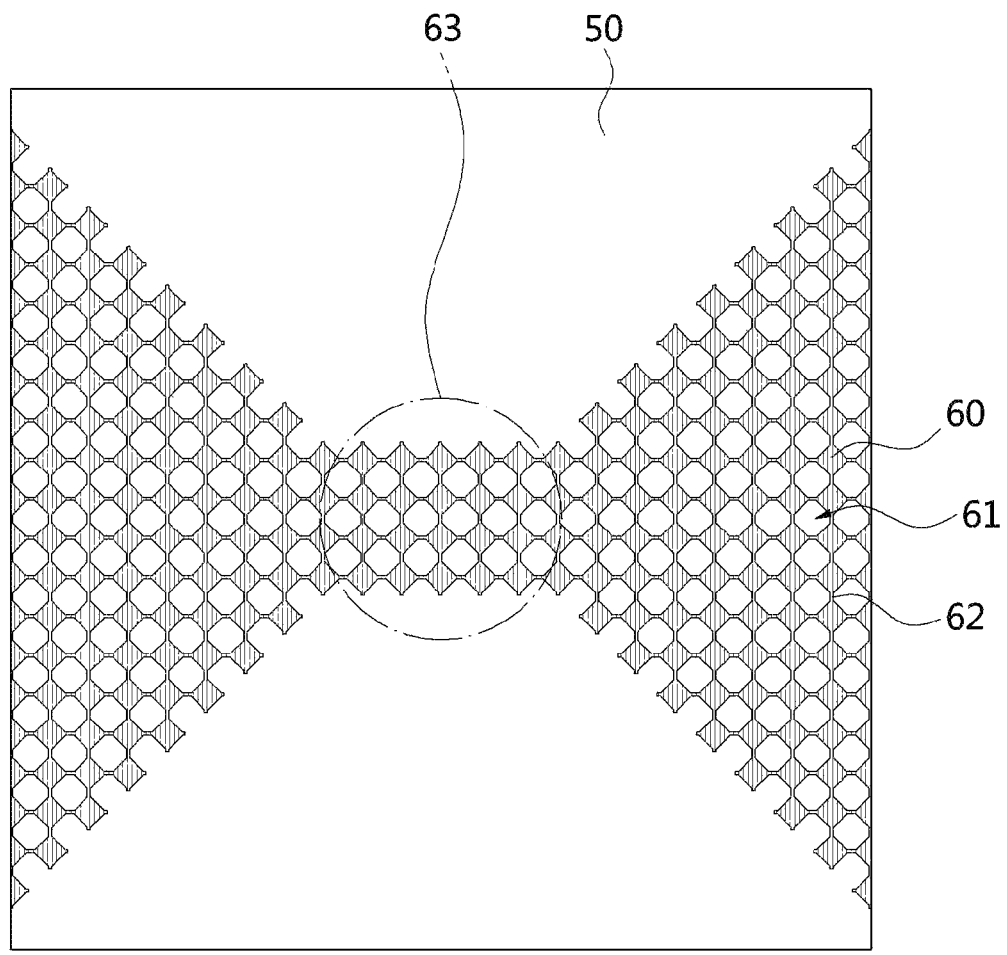
FIGS. 6 to 9 are schematic top plan views showing a second electrode layer of a touch sensor according to exemplary embodiments of the present disclosure.
Figure 7:
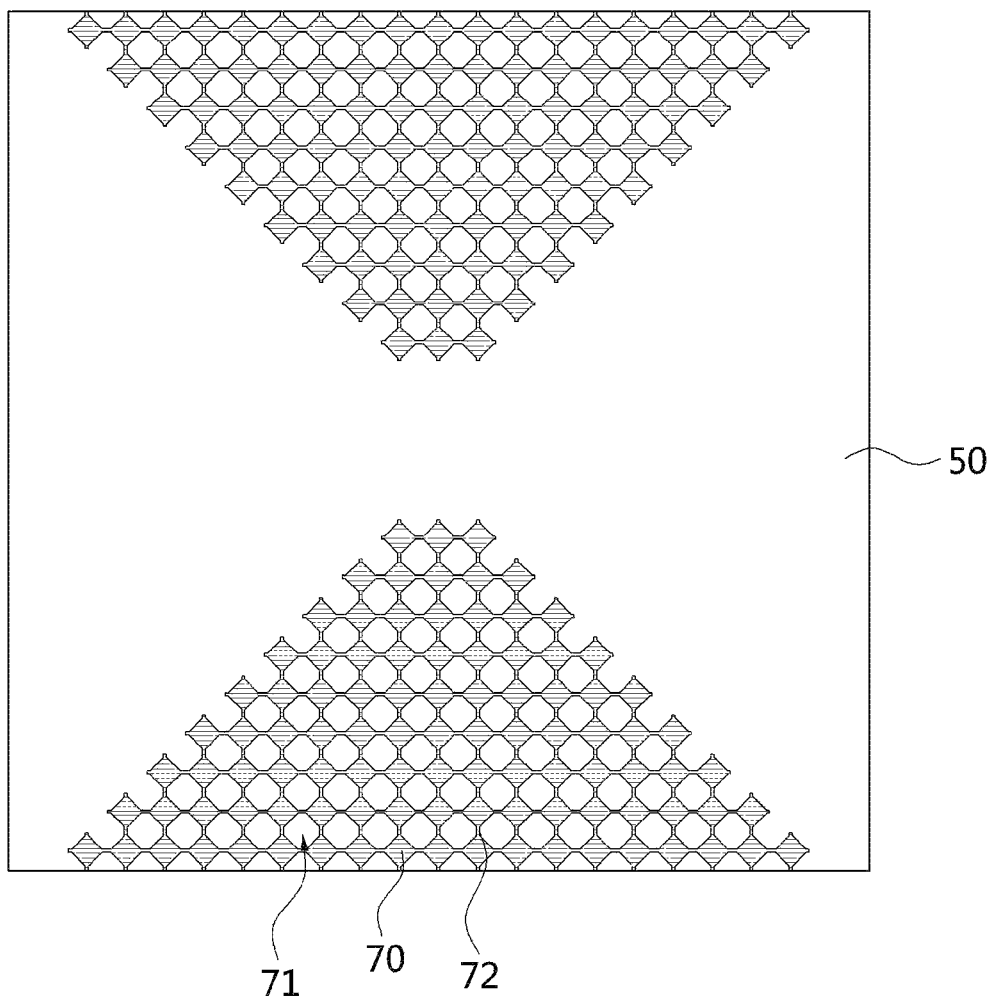
Figure 8:
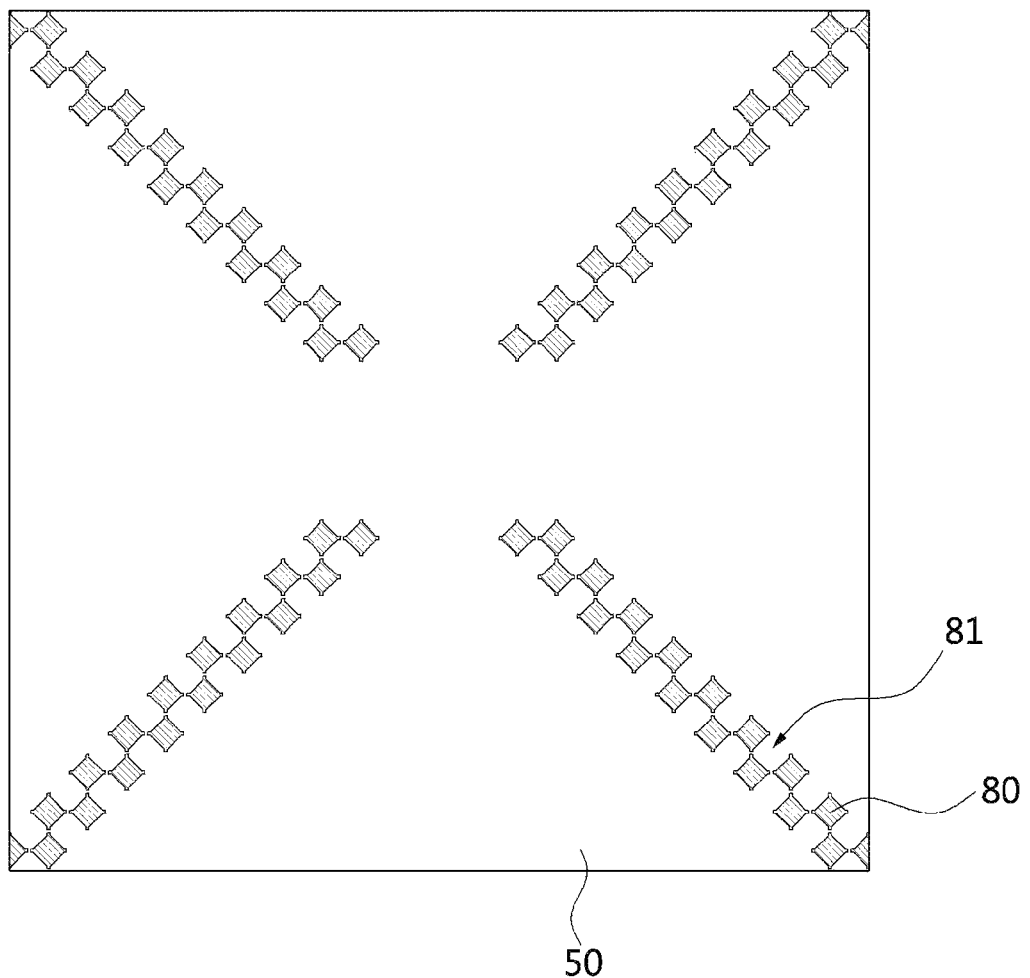
Figure 9:
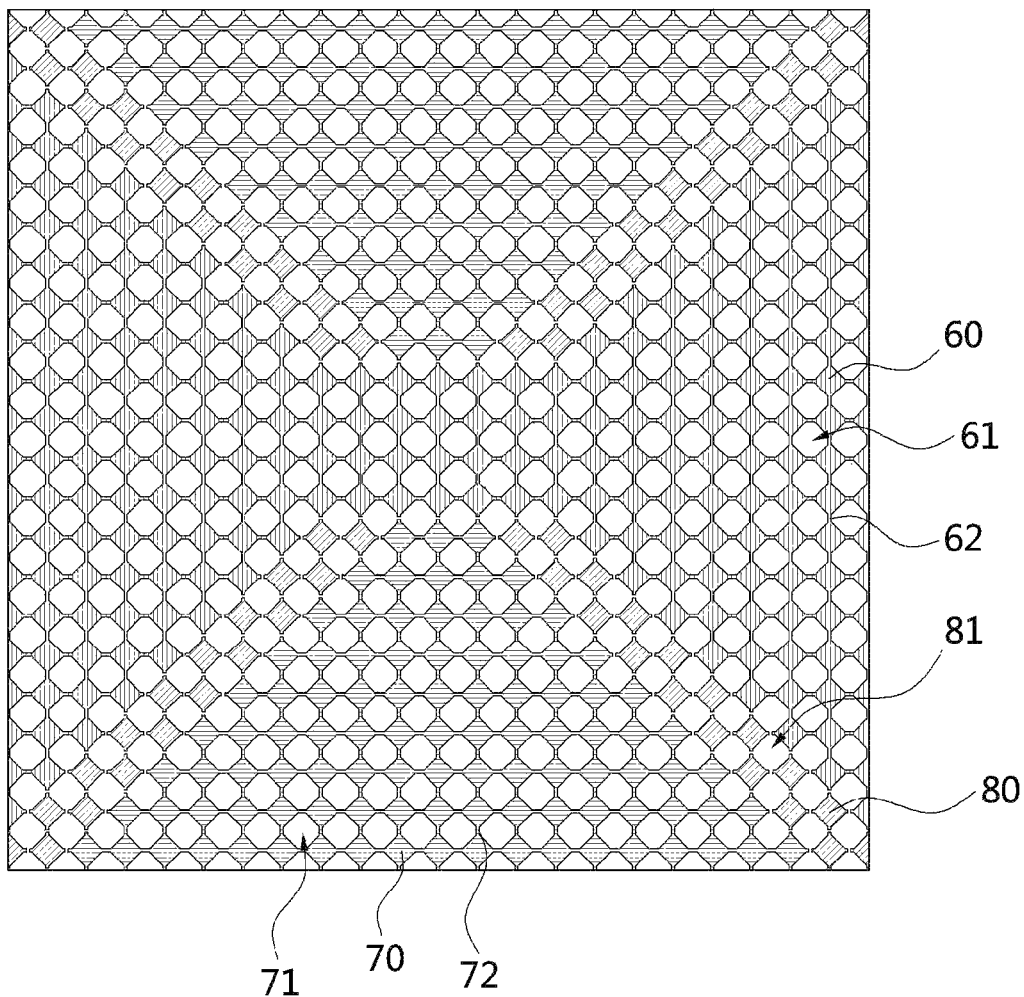

Specifically, FIG. 6 is a top plan view showing the second main electrode in isolation. FIG. 7 is a top plan view showing the second auxiliary electrode in isolation. FIG. 8 is a top plan view showing the second dummy electrode in isolation. FIG. 9 is a top plan view showing a second main electrode, a second auxiliary electrode, and a second dummy electrode together.

Referring to FIG. 6, the second main electrode may be formed on the base layer 10.

In one embodiment, the second main electrode may include a plurality of second main electrode unit patterns 60 that have a polygonal pattern shape, such as a rhombus shape, and are regularly repeated. In some embodiments, the second main electrode unit pattern 60 may have a shape substantially the same as or similar to that of the first groove 31 (see FIG. 3).

In an embodiment, the plurality of second main electrode unit patterns 60 may be arranged along a row direction, and the second main electrode unit patterns 60 adjacent in the row direction may be physically and electrically connected to the second main electrode unit pattern 60 provided in the second connection part 63.

In one embodiment, the plurality of second main electrode unit patterns 60 are integrally connected by the second connection part 63 to form second main electrode unit pattern rows extending in the row direction. The plurality of the second main electrode unit pattern rows may be arranged along a column direction.

The second main electrode unit pattern 60 may be physically and electrically connected by the adjacent second main electrode unit pattern 60 and a connection part 62, and the connection part 62 may be integrally formed with the second main electrode unit pattern 60.

The second main electrode may be formed by including a second hole 61. The second hole 61 is defined as a through-hole formed by the arrangement of a plurality of adjacent second main electrode unit patterns 60, and the upper surface of the base layer 10 is exposed through the second hole 61.

In one embodiment, the second hole 61 may have a polygonal shape, such as a substantially rhombic shape, and may be regularly repeated. The second hole 61 may also be formed in the second connection part 63.

Referring to FIG. 7, the second auxiliary electrode may be formed on the base layer 10.

According to an embodiment, when observed in a plane direction, the second auxiliary electrode may be formed on a portion of the upper surface of the base layer 10 where the second main electrode is not formed. The second auxiliary electrode may be formed around the second main electrode and spaced apart from the second main electrode.

In one embodiment, the second auxiliary electrode may include a plurality of second auxiliary electrode unit patterns 70 that have a polygonal pattern shape, such as a rhombus shape, and are regularly repeated. In one embodiment, the second auxiliary electrode unit pattern 70 may have a shape substantially the same as or similar to that of the first hole 21 (see FIG. 2).

The second auxiliary electrode unit pattern 70 may be physically and electrically connected by the adjacent second auxiliary electrode unit pattern 70 and a connection part 72, and the connection part 72 may be integrally formed with the second auxiliary electrode unit pattern 70.

The second auxiliary electrode may be formed to include the second groove 71. The second groove 71 is defined as a through-hole formed by the arrangement of a plurality of adjacent second auxiliary electrode unit patterns 70, and the upper surface of the base layer 10 is exposed through the second groove 71.

In one embodiment, the second groove 71 may have a polygonal shape, such as a substantially rhombic shape, and may be regularly repeated.

Referring to FIG. 8, the second dummy electrode may be formed on the base layer 10.

According to an embodiment, the second dummy electrode may be formed on a portion of the upper surface of the base layer 10 where the second main electrode and the second auxiliary electrode are not formed when viewed in a plane direction. The second dummy electrode may be formed around the second main electrode and the second auxiliary electrode and formed adjacent to the second main electrode and the first auxiliary electrode.

In one embodiment, the second dummy electrode may include a plurality of second dummy electrode unit patterns 80 that has a polygonal pattern shape, such as a rhombus shape, and are regularly repeated. In one embodiment, the second dummy electrode unit pattern 80 may have a shape substantially the same as or similar to that of the first space 41 (see FIG. 4).

The second dummy electrode unit patterns 80 may have separate floating patterns or island patterns but are not limited thereto and may be integrally formed by connecting the respective patterns.

The second dummy electrode may be formed to include the second space 81. The second space 81 is defined as a through-hole formed by the arrangement of a plurality of adjacent second dummy electrode unit patterns 80, and the upper surface of the base layer 10 is exposed through the second space 81. In one embodiment, the second space 81 may be a through-groove formed by a second main electrode unit pattern 60 or a second auxiliary electrode unit pattern 70 adjacent to three adjacent second dummy electrode unit patterns 80.

In one embodiment, the second space 81 may have a substantially rhombic shape in which one or more vertices are opened and may be repeated regularly but is not limited thereto, and the second space 81 may have a polygonal shape substantially like a rhombus shape by the integrally formed second dummy electrode unit pattern and may be regularly repeated.

Referring to FIG. 9, as described above, the second electrode layer may be formed by including a second main electrode, a second auxiliary electrode, and a second dummy electrode arranged on the upper surface of the base layer 10.

As shown in FIG. 9, the second auxiliary electrode may be disposed of at a predetermined distance from the second main electrode, and the second dummy electrode may be disposed of adjacent to the second main electrode and the second auxiliary electrode.

Therefore, the electrode pattern, the hole, the groove, and the space as a whole may be regularly repeated on the upper surface of the base layer 10, and the upper surface of the base layer 10 may be uniformized into an arrangement structure in the form of a spatial frequency including high-frequency components as a whole due to the repeating structure described above.

Figure 10A:
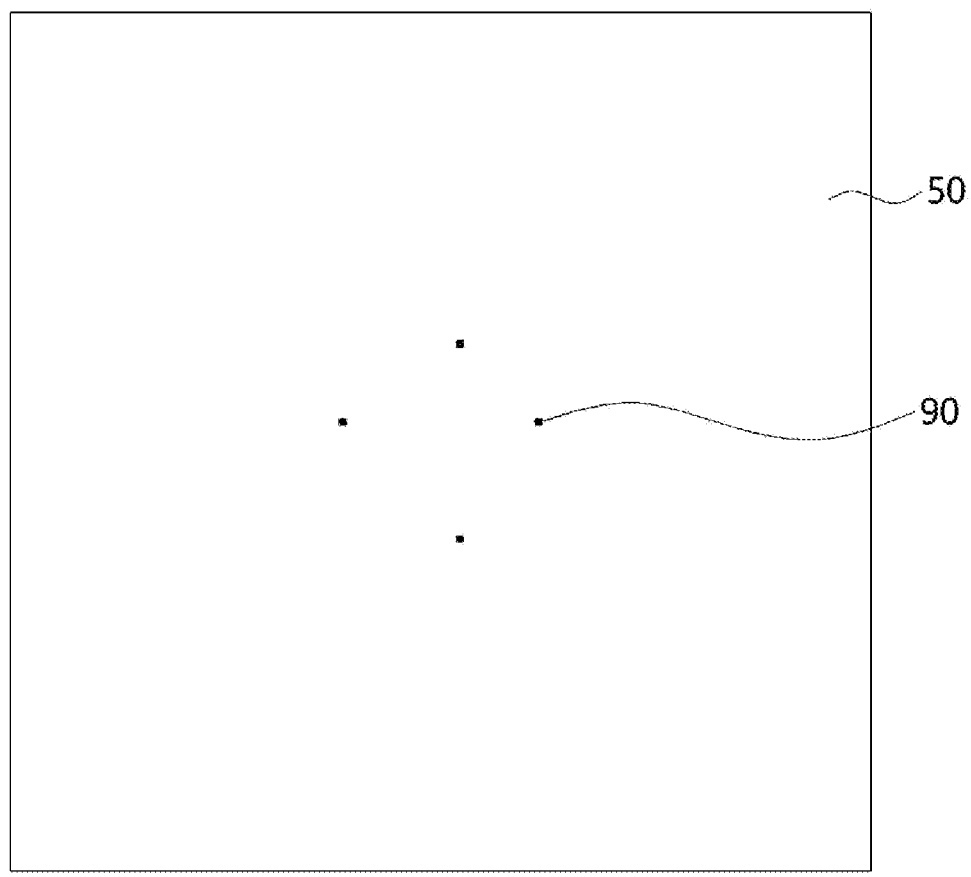
FIGS. 10A through 10C are schematic top plan views showing an insulating layer in which contact holes are formed according to exemplary embodiments of the present disclosure.
Figure 10B:
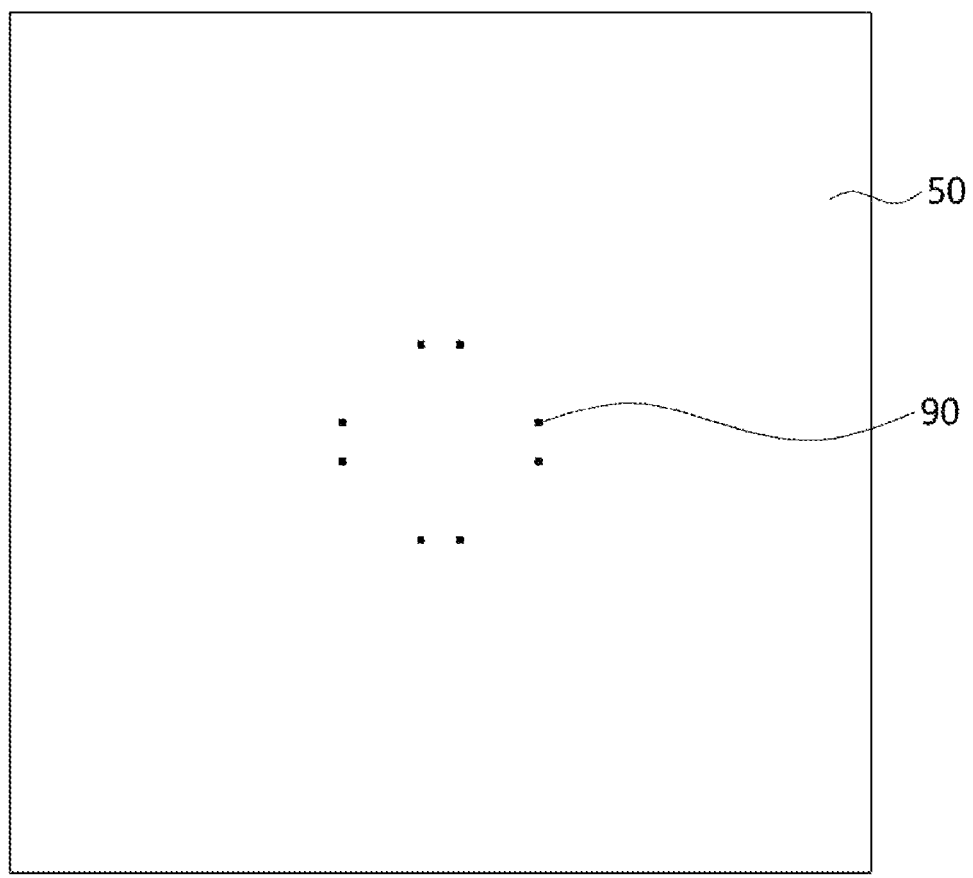
Figure 10C:
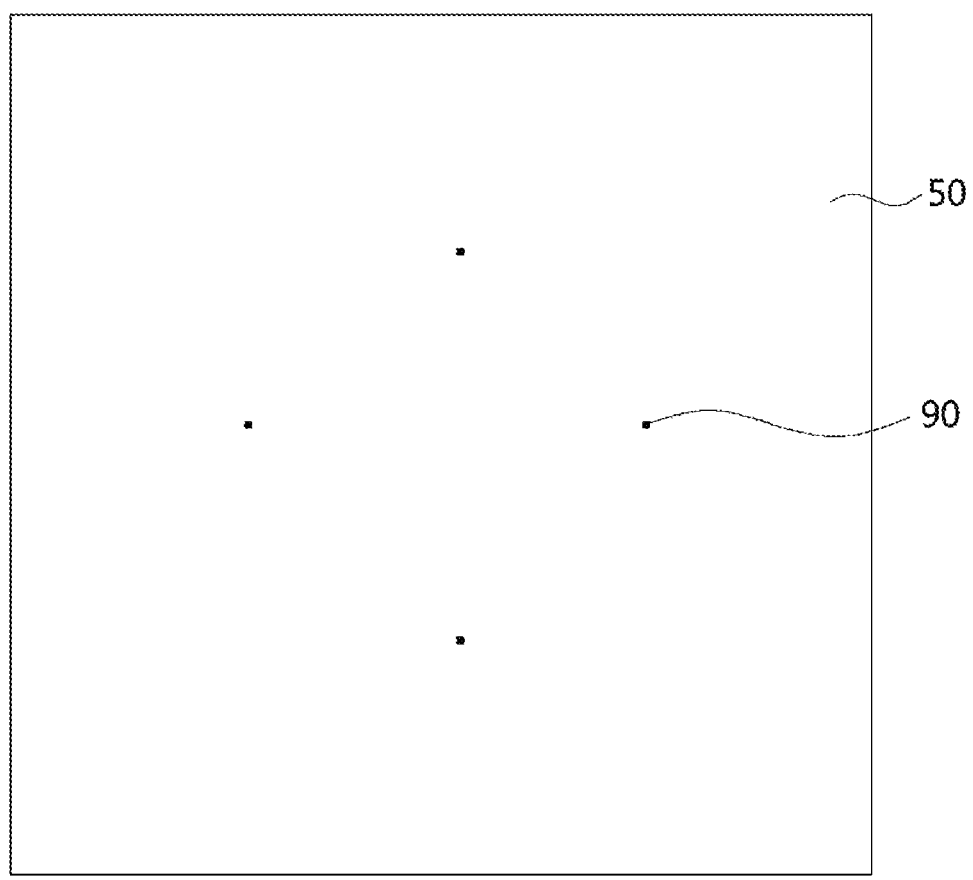

FIGS. 10A-10C are schematic top plan views showing an insulating layer in which contact holes are formed according to exemplary embodiments of the present disclosure.

In one embodiment, referring to FIG. 10A, the contact hole 90 may have a pair of contact holes 90 for electrically connecting the first main electrode and the second auxiliary electrode and a pair of contact holes 90 for electrically connecting the second main electrode and the first auxiliary electrode formed at positions most adjacent to the first connection part 23 and the second connection part 63.

In another embodiment, referring to FIG. 10B, the contact hole 90 may have two pairs of contact holes 90 for electrically connecting the first main electrode and the second auxiliary electrode and two pairs of contact holes 90 for electrically connecting the second main electrode and the first auxiliary electrode formed at positions most adjacent to the first connection part 23 and the second connection part 63.

In another embodiment, referring to FIG. 10C, the contact hole 90 may have a pair of contact holes 90 for electrically connecting the first main electrode and the second auxiliary electrode and a pair of contact holes 90 for electrically connecting the second main electrode and the first auxiliary electrode formed at a predetermined distance from the first connection part 23 and the second connection part 63.

The contact hole 90 may be formed on the insulating layer 50 in various forms other than those shown in FIGS. 10A to 10C, and is not particularly limited as long as the contact hole may minimize parasitic capacitance and channel resistance by electrically connecting the first main electrode and the second auxiliary electrode and the second main electrode and the first auxiliary electrode, and at least one is preferably formed.

The contact hole 90 is preferably formed at a point where the connection part 22 formed in the first main electrode, and the connection part 72 formed in the second auxiliary electrode, cross each other in the plane direction in terms of process economy, the conductivity of the touch sensor, and detection strength (see FIG. 11).

In one embodiment, the contact hole 90 may have a size of 30 μm×30 μm but is not particularly limited as long as the electrical connection between the first electrode layer and the second electrode layer may be performed.

The contact hole 90 electrically connects the first electrode layer and the second electrode layer, specifically, the first main electrode and the second auxiliary electrode, and the second main electrode and the first auxiliary electrode. Therefore, the first main electrode and the second auxiliary electrode, the second main electrode and the first auxiliary electrode respectively form an equal potential, thereby suppressing generation of parasitic capacitance and improving the resistance of an electrode channel.

FIG. 11 is a schematic top plan view showing an electrode layer of a touch sensor according to example embodiments. Specifically, FIG. 11 is a top plan view in which the first electrode layer shown in FIG. 5, the second electrode layer shown in FIG. 9, and the insulating layer 50 shown in FIG. 10B are projected together in a plane direction.

Referring to FIG. 11, the second auxiliary electrode unit pattern 70 may be overlapped with the first hole 21 formed inside the first main electrode in a plane direction. According to one embodiment, the second auxiliary electrode unit pattern 70 may be completely included in the first hole 21 in a plane direction.

The second main electrode unit pattern 60 may be overlapped with the first groove 31 formed inside the first auxiliary electrode in a plane direction. According to one embodiment, the second main electrode unit pattern 60 may be completely included in the first groove 31 in a plane direction.

The first auxiliary electrode unit pattern 30 may be overlapped with the second hole 61 formed inside the second main electrode in a plane direction. According to one embodiment, the first auxiliary electrode unit pattern 30 may be completely included in the second hole 61 in a plane direction.

The first main electrode unit pattern 20 may be overlapped with the second groove 71 formed inside the second auxiliary electrode in a plane direction. According to one embodiment, the first main electrode unit pattern 20 may be completely included in the second groove 71 in a plane direction.

In addition, the first main electrode unit pattern 20 formed on the first connection part 23 may be overlapped with the second hole 61 formed inside the second connection part 63 in a plane direction. According to one embodiment, the first main electrode unit pattern 20 may be completely included in the second hole 61 in a plane direction.

The second main electrode unit pattern 60 formed in the second connection part 63 may be overlapped with the first hole 21 formed inside the first connection part 23 in the plane direction. According to one embodiment, the second main electrode unit pattern 60 may be completely included in the first hole 21 in a plane direction.

The first dummy electrode unit pattern 40 may be overlapped with the second space 81 formed inside the second dummy electrode in a plane direction. According to one embodiment, the first dummy electrode unit pattern 40 may be completely included in the second space 81 in a plane direction.

The second dummy electrode unit pattern 80 may be overlapped with the first space 41 formed inside the first dummy electrode in a plane direction. According to one embodiment, the second dummy electrode unit pattern 80 may be completely included in the first space 41 in a plane direction.

The contact hole 90 may include two pairs of contact holes 90 for electrically connecting the first main electrode and the second auxiliary electrode and two pairs of contact holes 90 for electrically connecting the second main electrode and the first auxiliary electrode.

Specifically, two pairs of contact holes 90 may be formed at positions most adjacent to the first connection part 23 and the second connection part 63 among the points where a connection part 22 for connecting a plurality of adjacent first main electrode unit patterns 20 in the column direction and a connection part 72 for connecting a plurality of adjacent second auxiliary electrode unit patterns 70 in the row direction intersect in the plane direction. Also, two pairs of contact holes 90 may be formed at positions most adjacent to the first connection part 23 and the second connection part 63 among the points where a connection part 62 for connecting a plurality of adjacent second main electrode unit patterns 60 in the row direction and a connection part 32 for connecting a plurality of adjacent first auxiliary electrode unit patterns 30 in the column direction intersect in the plane direction.

In one or more embodiments, the contact hole may be provided at the point where a connection part for connecting a plurality of adjacent first main electrode unit patterns in a row direction and a connection part for connecting a plurality of adjacent second auxiliary electrode unit patterns in a column direction intersect each other in a plane direction, and/or the point where a connection part for connecting a plurality of adjacent second main electrode unit patterns in a column direction and a connection part for connecting a plurality of adjacent auxiliary electrode unit patterns in a row direction intersect in a planar direction. However, the contact hole is not necessarily formed with regularity and is not particularly limited as long as the contact hole may minimize parasitic capacitance and channel resistance by electrically connecting the first main electrode and the second auxiliary electrode and the second main electrode and the first auxiliary electrode.

According to an embodiment of the present disclosure, by forming a base layer, a first electrode layer formed on the base layer next, an insulating layer including a contact hole formed on the first electrode layer, and an insulating layer formed on the insulating layer, the first electrode layer and the second electrode layer are disposed on different layers with an insulating layer interposed therebetween, and the first main electrode and the second auxiliary electrode and the second main electrode and the first auxiliary electrode are electrically connected, respectively.

According to this embodiment of the present disclosure, the bridge electrode can be omitted so that the visibility of the bridge electrode can be improved.

In addition, as shown in FIG. 11, as each electrode pattern and a hole, groove, or space are arranged to overlap each other in a plane direction, the electrode visibility phenomenon can be improved.

Specifically, human visual perception characteristics represent human recognition (distinction) ability and contrast and may be expressed as a spatial frequency. Contrast refers to a difference in intensity between a tone of a certain portion of an image and a tone of another portion, and strong contrast of an image means a case in which the difference between lightness and darkness of a specific image is greater than normal. In the visibility of the electrode pattern, as the contrast increases, that is, as the difference in strength and weakness of the tone is clearly revealed, the ability to differentiate by human visual characteristics increases proportionally. In other words, it can be seen that the ability to differentiate contrast by human visual perception characteristics cannot be expressed as a single function of spatial frequency, and the ability to differentiate is rather reduced in the highest frequency region and the lowest frequency region of spatial frequency.

Using these characteristics, in the present disclosure, when the touch sensor is observed in a plane direction, the irregularity of the pattern is substantially removed, and the upper surface of the touch sensor is uniformized by high-frequency components that are not visible to the user, thereby improving the electrode visibility phenomenon.

In addition, as each electrode pattern and the hole, groove, or space are arranged to overlap each other, parasitic capacitance due to the arrangement of the electrode layer in the thickness direction can be suppressed. By including a contact hole for electrically connecting the first electrode layer and the second electrode layer in the insulating layer, parasitic capacitance and resistance of the electrode channel may be minimized compared to a touch sensor not including the contact hole, thereby implementing an ultra-thin touch sensor.

In FIGS. 2 to 9, the shape of each electrode pattern, hole, groove, and space is exemplified in a rhombus shape but is not limited thereto and may be used after being deformed into other polygons such as hexagons or circles.

Window Laminate and Image Display Device

The present disclosure includes a window substrate and a window laminate, including the touch sensor laminated on one surface of the window substrate.

In one embodiment, the window substrate may include a hard coating film and may include a light blocking pattern for defining a bezel part or a non-display area of an image display device.

The touch sensor may be included in a window laminate in the form of a film or panel, and when the touch sensor includes a substrate, in one or a plurality of embodiments, the substrate may include triacetyl cellulose, cycloolefin, cycloolefin copolymer, polynorbornene copolymer, and the like.

In one embodiment, the touch sensor may be directly transferred to a window substrate or the like and may be disposed in the order of the window substrate and the touch sensor from the user's viewing side.

The window laminate of the present disclosure may further include a functional film or a polarizing layer for performing various functions and may be attached by an adhesive or the like.

In one embodiment, the window laminate may further include a hard coating layer and/or an abrasion resistant layer.

The hard coating layer is not particularly limited as long as the hard coating layer is for protecting another substrate, such as a polarizing plate or a touch sensor, or an image display device, from external physical or chemical impact and a conventional or later developed hard coating layer may be used.

In one embodiment, the hard coating layer may be formed by applying a composition for forming a hard coating layer on a window substrate and then curing the composition with light or heat. The composition for forming the hard coating layer is not particularly limited and may include, for example, a photocurable compound and a photoinitiator.

The photocurable compound and photoinitiator may be used without limitation those commonly used in the art, and for example, the photocurable compound may be a photopolymerizable monomer, a photopolymerizable oligomer, for example, monofunctional and/or multifunctional (meth) acrylate, and the photoinitiator may be oxime ester-based.

The abrasion-resistant layer serves to improve the abrasion resistance of the surface on the viewer's side or prevent contamination by external substances.

The abrasion-resistant layer preferably contains a structure derived from a fluorine compound. The fluorine compound may have a silicon atom and a hydrolyzable functional group, such as an alkoxy group or a halogen radical.

The hydrolyzable functional group serves to form a coating film through a dehydration condensation reaction and improves the adhesion of the abrasion-resistant layer by reacting with active hydrogen on the surface of the substrate.

The fluorine compound may include a perfluoroalkyl group, a perfluoroalkylene group, a perfluoropolyether structure, and the like. There may be, for example, a fluorinated polyorgano siloxane compound having a perfluoropolyether structure and a long-chain alkyl group having 4 or more carbon atoms, and fluorinated organo siloxane compounds including alkylene group having 2 or more carbon atoms and a perfluoroalkylene group. In this case, water repellency may be imparted, and contamination by external substances may be effectively prevented.

The thickness of the abrasion-resistant layer is not particularly limited but may be 1 to 20 nm, and as the abrasion-resistant layer exhibits water repellency, the water contact angle is 100° to 125°, the contact angle hysteresis according to the sliding contact angle measurement method is 3° to 20°, and the dynamic contact angle may be in a range of 2° and 55°.

The abrasion-resistant layer may further include various additives such as a silanol condensation catalyst, an antioxidant, an anti-corrosion agent, an ultraviolet absorber, a light stabilizer, an antibacterial agent, a deodorant, a pigment, a flame retardant, an antistatic agent, and the like to the extent that does not harm the purpose of the disclosure.

In one embodiment, the abrasion-resistant layer may be formed on the upper surface of the hard coating layer and may further include a primer layer between the abrasion-resistant layer and the hard coating layer. In one or more embodiments, the primer layer may include a primer such as an ultraviolet curing agent, a thermal curing agent, a moisture curing agent, or an epoxy-based compound of a two-component curing agent. A polyamic acid or a silane coupling agent may also be used as a primer.

In one embodiment, the thickness of the primer layer is preferably 0.001 to 2 μm.

The method of forming the abrasion-resistant layer is not particularly limited, but, for example, may be formed by coating, drying, and curing a primer agent on the upper surface of the hard coating layer and then applying and drying a composition for forming an abrasion-resistant layer including a fluorine-based compound. As the coating method, for example, dip coating, roll coating, bar coating, spin coating, spray coating, die coating, gravure coating, and the like, may be used.

On the other hand, before applying the primer or the composition for forming an abrasion-resistant layer, it is preferable to subject the coated surface to a hydrophilic treatment such as corona treatment or ultraviolet treatment.

The window laminate, according to an embodiment, may be arranged in the order of an abrasion resistant layer, a hard coating layer, a window substrate, a polarizer, and a touch sensor from the user's viewing side. In this case, since the sensing electrodes of the touch sensor are disposed under the polarizer, the pattern recognition phenomenon can be more effectively prevented. The window laminate, according to an embodiment, may be arranged in the order of the abrasion-resistance layer, the hard coating layer, the window substrate, the touch sensor, and the polarizer from the user's viewing side.

In addition, the present disclosure includes a display panel; and an image display device including the touch sensor laminated on the display panel.

In one embodiment, the image display device may include the above-described window laminate on a display panel.

The display panel is not particularly limited, and a display panel used in a conventional image display device may be used. For example, display panels used in liquid crystal display devices, plasma display panel devices, electro luminescent display devices, organic light-emitting diode display devices, etc., may be used.

The window laminate and image display device, including the touch sensor of the present disclosure, have improved electrode visibility characteristics, improved conductivity and detection strength of the touch sensor, and improved flexible characteristics compared to the conventional window laminate and image display device, thereby being more suitable for flexible displays and the like.

Mode for Disclosure

Hereinafter, in order to aid understanding of the present disclosure, experimental examples including specific examples and comparative examples are presented, but these are only illustrative of the present disclosure and do not limit the scope of the appended claims. It is obvious to those skilled in the art that various changes and modifications to the embodiments are possible within the scope and spirit of the present disclosure, and it is natural that such changes and modifications fall within the scope of the appended claims.

EXAMPLES AND COMPARATIVE EXAMPLES

Example 1

A first electrode layer, including a mesh-shaped metal electrode pattern, is disposed on a PI substrate having a thickness of 20 μm in the same form as shown in FIG. 5. Thereafter, an insulating layer having a thickness of 2 μm covering the first electrode layer is coated on the PI substrate, and a contact hole with a size of 30 μm×30 μm is formed in the same form as shown in FIG. 10A. Next, a second electrode layer, including a mesh-shaped metal electrode pattern, is disposed on the insulating layer in the same form as shown in FIG. 9. Thereafter, a touch sensor of Example 1 was manufactured by forming a passivation layer covering the second electrode layer on the insulating layer.

Example 2

The touch sensor of Example 2 was manufactured in the same manner as in Example 1, except that a contact hole with a size of 30 μm×30 μm was formed in the insulating layer in the same shape as shown in FIG. 10B.

Example 3

The touch sensor of Example 3 was manufactured in the same manner as in Example 1, except that a contact hole with a size of 30 μm×30 μm was formed in the insulating layer in the same shape as shown in FIG. 10C.

Example 4

The touch sensor of Example 4 was manufactured in the same manner as in Example 1, except that the connection part formed in the first electrode layer and the connection part formed in the second electrode layer form contact holes with a size of 30 μm×30 μm at all points intersecting each other in the plane direction.

Comparative Example 1

The touch sensor of Comparative Example 1 was manufactured in the same manner as in Example 1, except that no contact hole was formed in the insulating layer.

Experiment Example

Sensitivity Evaluation

In order to evaluate the sensitivity of the touch sensor according to the above Examples and Comparative Example, the amount of change in mutual-capacitance (Cm) was measured and shown in Table 1 below.

Channel Resistance Evaluation

In order to evaluate the channel resistance of the touch sensor according to the above Examples and Comparative Examples, the resistance of the receiver (Rx) patterning channel and the transmitter (Tx) patterning channel with respect to an electrode of surface resistance (Rs) 9Ω/□ was measured, and the channel resistance improvement rate shown based on Comparative Example 1 is shown in Table 1 below.

TABLE 1

| | | | | | Electrode Rs: 9Ω/□ | | |
|---|---|---|---|---|---|---|---|
| | Cm(pF) | | Delta Cm | | | | Improvement rate |
| Division | Base | Finger | Δ(pF) | % | Rx(Ω) | Tx(Ω) | |
| Example 1 | 0.863 | 0.655 | 0.208 | 24.1 | 138.8 | 138.8 | 25.5% |
| Example 2 | 0.863 | 0.655 | 0.208 | 24.1 | 131.92 | 131.92 | 30% |
| Example 3 | 0.863 | 0.655 | 0.208 | 24.1 | 171.66 | 171.66 | 8% |
| Example 4 | 0.863 | 0.655 | 0.208 | 24.1 | 124.9 | 124.9 | 32.9% |
| Comparative Example 1 | 0.823 | 0.614 | 0.210 | 25.5 | 186.2 | 186.2 | Reference |

Regarding the change rate of mutual capacitance (Cm), the touch sensors represented by Examples 1 to 4 were all 0.208 (24.1%), which is sufficient to recognize a signal caused by a user's touch.

Regarding the resistance of the receiver (Rx) patterning channel and the transmitter (Tx) patterning channel, as compared with Comparative Example 1, the improvement rate of Example 1 was 25.5%, the improvement rate of Example 2 was 30%, the improvement rate of Example 3 was 8%, and the improvement rate of Example 4 was 32.9%, and the channel resistance was reduced. Therefore, it can be seen that the conductivity and detection intensity of the touch sensor is further improved.

INDUSTRIAL APPLICABILITY

According to the touch sensor of the present disclosure, the visibility of bridge electrodes and electrode patterns, parasitic capacitance noise characteristics, and electrode channel resistance characteristics are further improved compared to conventional touch sensors, and since an ultra-thin film type touch sensor can be implemented, thereby being industrial applicability.

The invention claimed is:

1. A touch sensor comprising:
   a first electrode layer comprising a first main electrode and a first auxiliary electrode formed to be spaced apart from the first main electrode;
   a second electrode layer comprising a second main electrode and a second auxiliary electrode formed to be spaced apart from the second main electrode; and
   an insulating layer provided between the first electrode layer and the second electrode layer, wherein the first electrode layer comprises a first dummy electrode configured to distinguish the first main electrode and the first auxiliary electrode from each other, the first dummy electrode is formed adjacent to the first main electrode and the first auxiliary electrode, the second electrode layer comprises a second dummy electrode configured to distinguish the second main electrode and the second auxiliary electrode from each other, the second dummy electrode is formed adjacent to the second main electrode and the second auxiliary electrode, the first main electrode further comprises a first connection part connecting adjacent first main electrode unit patterns along a column direction, the first connection part comprises a first hole defined by a plurality of adjacent first main electrode unit patterns, the second main electrode further comprises a second connection part connecting adjacent second main electrode unit patterns along a row direction, the second connection part comprises a second hole defined by a plurality of adjacent second main electrode unit patterns, the plurality of adjacent first main electrode unit patterns formed in the first connection part overlaps the second hole formed in the second connection part in a plan view, the plurality of adjacent second main electrode unit patterns formed in the second connection part overlaps the first hole formed in the first connection part in a plan view, and the insulating layer comprises a contact hole for electrically connecting the first electrode layer and the second electrode layer.

2. The touch sensor of claim 1, wherein the contact hole is for electrically connecting the first main electrode to the second auxiliary electrode facing the first main electrode.

3. The touch sensor of claim 1, wherein the contact hole is formed at a point where a connection part formed in the first main electrode and a connection part formed in the second auxiliary electrode facing the first main electrode cross each other in a plan view.

4. The touch sensor of claim 1, wherein the contact hole is for electrically connecting the second main electrode to the first auxiliary electrode facing the second main electrode.

5. The touch sensor of claim 4, wherein the contact hole is formed at a point where a connection part formed in the second main electrode and a connection part formed in the first auxiliary electrode facing the second main electrode cross each other in a plan view.

6. The touch sensor of claim 1, wherein the contact hole comprises one or more contact holes.

7. The touch sensor of claim 1, wherein the first main electrode comprises:
   first main electrode unit patterns that are regularly repeated and integrally connected to each other,
   the first auxiliary electrode comprises first auxiliary electrode unit patterns that are regularly repeated and integrally connected to each other,
   the second main electrode comprises second main electrode unit patterns that are regularly repeated and integrally connected to each other, and
   the second auxiliary electrode comprises second auxiliary electrode unit patterns that are regularly repeated and integrally connected to each other.

8. The touch sensor of claim 7, wherein the first main electrode comprises a first hole defined by a plurality of adjacent first main electrode unit patterns, the first auxiliary electrode comprises a first groove defined by a plurality of adjacent first auxiliary electrode unit patterns, the second main electrode unit patterns and the first groove overlap each other in a plan view, and the second auxiliary electrode unit patterns and the first hole overlap each other in a plan view.

9. The touch sensor of claim 7, wherein the second main electrode comprises a second hole defined by a plurality of adjacent second main electrode unit patterns, the second auxiliary electrode comprises a second groove defined by a plurality of adjacent second auxiliary electrode unit patterns, the first main electrode unit patterns and the second groove overlap each other in a plan view, and the first auxiliary electrode unit patterns and the second hole overlap each other in a plan view.

10. The touch sensor of claim 1, wherein the first dummy electrode comprises regularly repeated first dummy electrode unit patterns, and the second dummy electrode comprises regularly repeated second dummy electrode unit patterns.

11. The touch sensor of claim 10, wherein the first dummy electrode comprises a first space defined by a plurality of adjacent first dummy electrode unit patterns, the second dummy electrode comprises a second space defined by a plurality of adjacent second dummy electrode unit patterns, the plurality of adjacent first dummy electrode unit patterns and the second space overlap each other in a plan view; and the plurality of adjacent second dummy electrode unit patterns and the first space overlap each other in a plan view.

12. A window laminate comprising:

a window substrate; and the touch sensor of claim 1, the touch sensor being laminated on a first surface of the window substrate.

13. The window laminate of claim 12, further comprising a hard coating layer laminated on a second surface of the window substrate, a second substrate being opposite to the first surface.

14. The window laminate of claim 13, further comprising an abrasion-resistant layer laminated on the second surface of the window substrate.

15. The window laminate of claim 14, wherein a lower surface of the hard coating layer is placed on the second surface of the window substrate, and a lower surface of the abrasion-resistant layer is placed on an upper surface of the hard coating layer.

16. An image display device comprising:

a display panel; and the touch sensor of claim 1, the touch sensor being laminated on the display panel.

* * * * *